US010277012B2

(12) United States Patent
Kurosawa et al.

(10) Patent No.: US 10,277,012 B2
(45) Date of Patent: Apr. 30, 2019

(54) SPARK PLUG INCLUDING A MAGNETIC SUBSTANCE AND A CONDUCTOR DISPOSED THEREON

(71) Applicant: NGK SPARK PLUG CO., LTD., Nagoya-shi, Aichi (JP)

(72) Inventors: Kazuhiro Kurosawa, Gifu (JP); Katsuya Takaoka, Ichinomiya (JP); Kota Yokoyama, Iwakura (JP); Kuniharu Tanaka, Komaki (JP); Hirokazu Kurono, Nagoya (JP); Hironori Uegaki, Nagoya (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 16/106,103

(22) Filed: Aug. 21, 2018

(65) Prior Publication Data

US 2019/0067914 A1 Feb. 28, 2019

(30) Foreign Application Priority Data

Aug. 22, 2017 (JP) ................................ 2017-159007

(51) Int. Cl.

| | |
|---|---|
| ***H01T 13/05*** | (2006.01) |
| ***C01G 49/02*** | (2006.01) |
| ***C01G 51/04*** | (2006.01) |
| ***C01G 53/04*** | (2006.01) |
| ***C01G 53/00*** | (2006.01) |

(52) U.S. Cl.

CPC .................................. *H01T 13/05* (2013.01)

(58) Field of Classification Search

CPC ..... C01G 49/0063; C01G 53/04; F02P 7/025; H01T 13/05; H01T 13/20; H01T 13/41

See application file for complete search history.

(56) References Cited

U.S. PATENT DOCUMENTS 4,219,707 A * 8/1980 Sawada .................. F02P 7/025 123/633

4,713,582 A * 12/1987 Yamada ................. H01T 13/41 252/513

(Continued)

FOREIGN PATENT DOCUMENTS

JP 58-165577 9/1983

JP 2004-259605 9/2004

(Continued)

*Primary Examiner* — Tracie Y Green

(74) *Attorney, Agent, or Firm* — Kusner & Jaffe

(57) ABSTRACT

A spark plug having a connection portion disposed between a metal terminal and a center electrode. The connection portion includes: a magnetic substance formed from a Fe-containing oxide; a conductor which is a wire helically disposed on an outer periphery of the magnetic substance and electrically connected to the metal terminal and the center electrode; and an intermediate member which is in contact with the magnetic substance, the conductor, and an inner peripheral surface of the insulator, is disposed between the magnetic substance and the conductor, and the inner peripheral surface of the insulator, and has lower electrical conductivity than the conductor. The conductor is made of one or more of an oxide conductor, carbon, and a carbon compound.

17 Claims, 3 Drawing Sheets

(56) References Cited

U.S. PATENT DOCUMENTS

| | | | | |
|---|---|---|---|---|
| 5,942,842 | A * | 8/1999 | Fogle, Jr. ................ | F42B 3/188 313/134 |
| 2015/0318672 | A1 | 11/2015 | Iwasaki et al. | |
| 2015/0325982 | A1* | 11/2015 | Takaoka .................. | H01T 13/04 315/71 |
| 2015/0349498 | A1 | 12/2015 | Takaoka et al. | |
| 2016/0322789 | A1* | 11/2016 | Takaoka ................... | F02P 11/00 |
| 2018/0166861 | A1* | 6/2018 | Kurosawa ............... | H01T 13/20 |

FOREIGN PATENT DOCUMENTS

| | | | |
|---|---|---|---|
| JP | WO2015/099081 | A1 * | 2/2015 |
| JP | 2015-213011 | | 11/2015 |
| JP | 2015-225793 | | 12/2015 |

* cited by examiner

SPARK PLUG INCLUDING A MAGNETIC SUBSTANCE AND A CONDUCTOR DISPOSED THEREON

RELATED APPLICATIONS

This application claims the benefit of Japanese Patent Application No. 2017-159007, filed Aug. 22, 2017, the entire content of which is incorporated herein by reference.

FIELD OF THE INVENTION

The present invention relates to a spark plug and particularly relates to a spark plug including a magnetic substance.

BACKGROUND OF THE INVENTION

A spark plug including a ferrite having a metallic coil embedded therein in order to reduce electric wave noise generated during discharge has been known (Japanese Patent Application Laid-Open (kokai) No. 2015-225793).

However, in the above conventional art, the metallic coil is easily oxidized, and thus there is a possibility that the coil causes a reduction in the service life of the spark plug.

The present invention has been made to address the above-described problem. An advantage of the present invention is a spark plug that can inhibit a reduction in the service life thereof.

SUMMARY OF THE INVENTION

In accordance with a first aspect of the present invention, there is provided a spark plug that includes: an insulator having an axial hole extending in an axial line direction from a front side to a rear side; a center electrode disposed at the front side of the axial hole; a metal terminal disposed at the rear side of the axial hole; and a connection portion disposed in the axial hole and between the metal terminal and the center electrode. The connection portion includes: a magnetic substance formed from a Fe-containing oxide; a conductor which is a wire helically disposed on an outer periphery of the magnetic substance and electrically connected to the metal terminal and the center electrode; and an intermediate member which is in contact with the magnetic substance, the conductor, and an inner peripheral surface of the insulator, is disposed between the magnetic substance and the conductor, and the inner peripheral surface of the insulator, and has lower electrical conductivity than the conductor. The conductor is made of one or more of an oxide conductor, carbon, and a carbon compound.

In the spark plug according to the first aspect, since the conductor, which is a wire helically disposed on the outer periphery of the magnetic substance and electrically connected to the metal terminal and the center electrode, is made of one or more of an oxide conductor, carbon, and a carbon compound, the conductor can be less likely to be oxidized. In addition, since the intermediate member having lower electrical conductivity than the conductor is in contact with the magnetic substance, the conductor, and the inner peripheral surface of the insulator and is disposed between the magnetic substance and the conductor, and the inner peripheral surface of the insulator, the conductor can be less likely to vibrate, and breakage of the conductor due to vibration can be less likely to occur. Accordingly, a reduction in service life can be inhibited.

In accordance with a second aspect of the present invention, there is provided a spark plug as described above, wherein at least one of the conductor and the intermediate member further contains at least one of Si, B, and P. Thus, the compactness of the member containing at least one of Si, B, and P can be improved. Accordingly, in addition to the effect of the first aspect, breakage of the conductor due to vibration can be further less likely to occur.

In accordance with a third aspect of the present invention, there is provided a spark plug as described above, wherein the intermediate member contains a Fe-containing oxide. Thus, the energy of noise can be consumed due to magnetic loss by the Fe-containing oxide. Accordingly, in addition to the effect of the first or second aspect, a noise attenuation effect can be improved.

In accordance with a fourth aspect of the present invention, there is provided a spark plug as described above, wherein at least a part of a surface of the conductor is covered with a coating layer made of a metal. Therefore, when the magnetic substance or the intermediate member contains a glass component, the coating layer can be interposed between the conductor and the glass component to inhibit reaction between the conductor and the glass component. Thus, wear of the conductor due to reaction with the glass component can be inhibited, so that a reduction in service life due to wear of the conductor can be inhibited in addition to the effect of any of the first to third aspects.

In accordance with a fifth aspect of the present invention, there is provided a spark plug as described above, wherein the coating layer is formed from Ni or a Ni-based alloy. Thus, in addition to the effect of the fourth aspect, the corrosion resistance of the coating layer can be enhanced with the heat resistance thereof maintained. Moreover, the magnetic permeability of the coating layer can be increased by Ni, and thus the noise attenuation effect can be improved.

In accordance with a sixth aspect of the present invention, there is provided a spark plug as described above, wherein at least a part of a surface of the conductor is covered with a magnetic layer containing a Fe-containing oxide. The energy of noise can be consumed due to magnetic loss of the magnetic layer, and thus the noise attenuation effect can be further improved in addition to the effect of any of the first to fifth aspects.

DETAILED DESCRIPTION OF THE INVENTION

Figure 1:
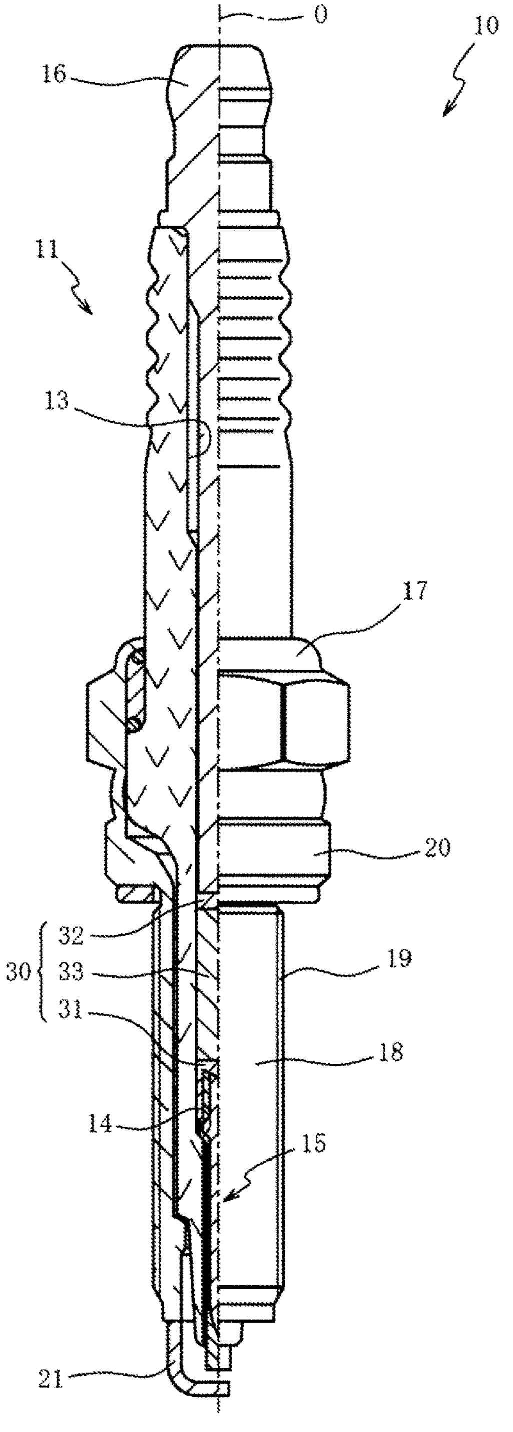
FIG. 1 is a half cross-sectional view of a spark plug according to a first embodiment of the present invention.

Hereinafter, preferred embodiments of the present invention will be described with reference to the accompanying drawings. FIG. 1 is a half cross-sectional view, with an axial line O as a boundary, of a spark plug 10 according to a first embodiment of the present invention. In FIG. 1, the lower side in the drawing sheet is referred to as a front side of the spark plug 10, and the upper side in the drawing sheet is referred to as a rear side of the spark plug 10 (the same applies to FIGS. 2 and 3). The spark plug 10 includes an insulator 11, a center electrode 15, and a metal terminal 16.

The insulator 11 is a member formed from alumina or the like which has an excellent mechanical property and insulation property at high temperature, and an axial hole penetrates the insulator 11 along the axial line O, whereby an inner peripheral surface 13 is formed in the insulator 11. The inner peripheral surface 13 has a rearward facing surface 14 provided at the front side so as to face toward the rear side. The rearward facing surface 14 has an inner diameter gradually decreasing toward the front end.

The center electrode 15 is a rod-shaped member which extends along the axial line O and in which a core material formed of copper or containing copper as a main component is covered with nickel or a nickel-based alloy. The center electrode 15 is engaged with the rearward facing surface 14 of the inner peripheral surface 13 and exposed at a front end thereof from the axial hole of the insulator 11.

The metal terminal 16 is a rod-shaped member to which a high-voltage cable (not shown) is to be connected, and is formed from a metallic material having electrical conductivity (for example, low-carbon steel, etc.). The metal terminal 16 is fixed to the rear end of the insulator 11 in a state where the front side thereof is inserted in the axial hole of the insulator 11.

A metal shell 17 is fixed to the outer periphery of the insulator 11. The metal shell 17 is a substantially cylindrical member formed from a metallic material having electrical conductivity (for example, low-carbon steel, etc.). The metal shell 17 includes: a trunk portion 18 which surrounds the outer periphery of a front-side portion of the insulator 11; and a seat portion 20 which is connected to the rear side of the trunk portion 18 and projects radially outward so as to have a flange shape. An external thread 19 is formed on the outer peripheral surface of the trunk portion 18. The metal shell 17 is fixed by fastening the external thread 19 into a thread hole (not shown) of an internal combustion engine (cylinder head).

A ground electrode 21 is a member which is made of a metal (for example, a nickel-based alloy) and is joined to the front end of the metal shell 17. In the present embodiment, the ground electrode 21 is formed in a rod shape and is bent at a front side thereof so as to oppose the center electrode 15. The ground electrode 21 forms a spark gap between the center electrode 15 and the ground electrode 21.

A connection portion 30 is a portion which electrically connects the center electrode 15 and the metal terminal 16 to each other, and is disposed in the axial hole. The connection portion 30 includes: a composite portion 33 including a magnetic substance 34 and a conductor 35 (described later); a first seal portion 31 which is in contact with the center electrode 15 and the composite portion 33; and a second seal portion 32 which is in contact with the composite portion 33 and the metal terminal 16.

The first seal portion 31 and the second seal portion 32 are formed from a composition containing glass particles of a $B_2O_3$—$SiO_2$-based material, a BaO—$B_2O_3$-based material, a $SiO_2$—$B_2O_3$—CaO—BaO-based material, or the like and metal particles (Cu, Fe, or the like) and have electrical conductivity. The composite portion 33 is a portion for reducing electric wave noise generated during discharge.

Figure 2:
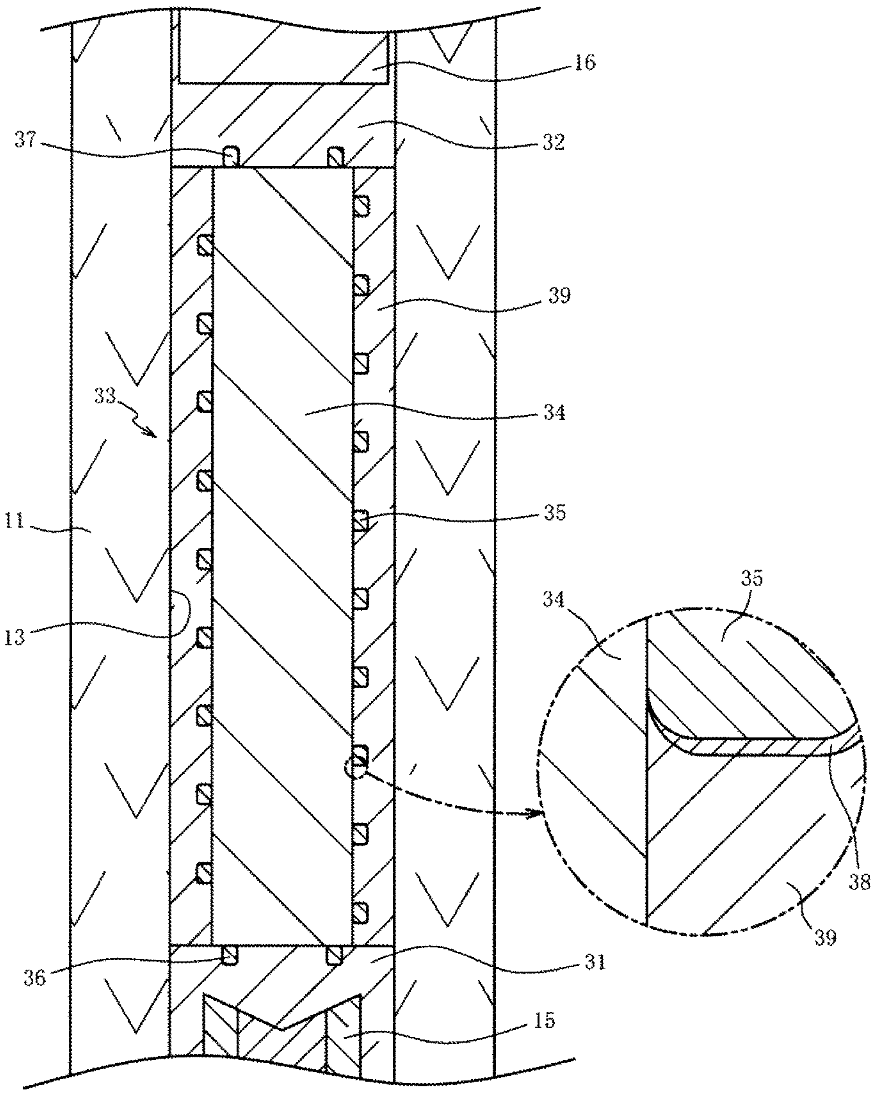
FIG. 2 is a cross-sectional view of a connection portion.

FIG. 2 is a cross-sectional view, including the axial line O (see FIG. 1), of the connection portion 30. In FIG. 2, the metal shell 17, which is disposed on the outer periphery of the insulator 11, is not shown. In the connection portion 30, the first seal portion 31, the composite portion 33, and the second seal portion 32 are connected in series. The composite portion 33 includes: the magnetic substance 34 which has a rod shape and is formed from a Fe-containing oxide; the conductor 35 which is helically disposed on the outer periphery of the magnetic substance 34; and an intermediate member 39 which is in contact with the magnetic substance 34, the conductor 35, and the inner peripheral surface 13 of the insulator 11 and is disposed between the magnetic substance 34 and the conductor 35, and the inner peripheral surface 13. A terminal 36 connected at the lower end of the conductor 35 in the axial line O direction (the up-down direction in FIG. 2) is in contact with the first seal portion 31, and a terminal 37 connected at the upper end of the conductor 35 is in contact with the second seal portion 32.

The magnetic substance 34 is a member containing iron oxide, and is formed in a cylindrical shape in the present embodiment. For the magnetic substance 34, a ferrite containing iron oxide as a main component, such as a spinel type and a garnet type, is suitably used. The magnetic substance 34 is obtained, for example, by: performing molding by a known method such as press molding, injection molding, and extrusion; and sintering the molded product. The magnetic substance 34 blocks or absorbs, due to impedance or magnetic loss thereof, current in a frequency band that causes electric wave noise, among current flowing between the first seal portion 31 and the second seal portion 32 during discharge.

Examples of ferrites include simple ferrites such as $Mn_XFe_{2-X}O_4$, $Ni_XFe_{2-X}O_4$, $Cu_XFe_{2-X}O_4$, $Zn_XFe_{2-X}O_4$, $Co_XFe_{2-X}O_4$, $Fe_XFe_{2-X}O_4$, $Ca_XFe_{2-X}O_4$, $Mg_XFe_{2-X}O_4$, $Y_3Fe_5O_{12}$, $Dy_3Fe_5O_{12}$, $Lu_3Fe_5O_{12}$, $Yb_3Fe_5O_{12}$, $Tm_3Fe_5O_{12}$, $Er_3Fe_5O_{12}$, $Ho_3Fe_5O_{12}$, $Tb_3Fe_5O_{12}$, $Gd_3Fe_5O_{12}$, and $Sm_3Fe_5O_{12}$, and composite ferrites in which these simple ferrites are solid-dissolved with each other at an arbitrary proportion, such as $(Mm_{1-X}Zn_X)Fe_2O_4$ and $(Ni_{1-X}Zn_X)Fe_2O_4$. One or more ferrites can be selected from among these ferrites and used.

The conductor 35 is a coil made of one or more of wires of an oxide conductor, carbon, and a carbon compound. The helical conductor 35 can ensure the impedance of the composite portion 33 and limit discharge current. The conductor 35 is obtained, for example, by performing molding into a wire shape by a known method such as extrusion, helically winding the molded product on the outer periphery of the magnetic substance 34, and then sintering these components. The molded product for the conductor 35 may be sintered simultaneously with a molded product for the magnetic substance 34, or may be sintered at a temperature lower than a sintering temperature for the magnetic substance 34, in a state of being wound on the magnetic substance 34 (sintered product).

Suitably, the diameter of the wire forming the conductor 35 is 0.1 to 1 mm, the outer diameter of the coil is 1 to 3 mm, the inter-wire gap of the coil is 0.3 to 1 mm, and the length of the coil in the axial line O direction is 7 to 30 mm. When the diameter of the wire is set to 0.1 to 1 mm, the conductor 35 can be less likely to be broken, and a desired inter-wire gap of the coil can be ensured and a parasitic capacitance can be reduced. When the outer diameter of the coil is set to 1 to 3 mm, the coil can be easily processed, and can be easily disposed within the axial hole. When the inter-wire gap of the coil is set to 0.3 to 1 mm, the impedance of the coil can be ensured and the parasitic capacitance can be reduced. When the length of the coil is set to 7 to 30 mm, the impedance of the coil can be ensured and the coil can be easily disposed within the axial hole.

Examples of the oxide conductor forming the conductor 35 include: oxides of metals such as Mn, Co, Ni, Fe, Cr, In, Sn, Ir, and the like having electrical conductivity or semiconductivity; and composite oxides obtained by combining two or more of these oxides, such as a perovskite type and a spinet type. Examples of the carbon compound forming the conductor 35 include inorganic compounds having electrical conductivity or semiconductivity such as silicon carbide (SiC), boron carbide ($B_4C$), aluminum carbide ($Al_4C_3$), titanium carbide (TiC), zirconium carbide (ZrC), vanadium carbide (VC), niobium carbide (NbC), tantalum carbide (TaC), chromium carbide ($Cr_3C_2$), molybdenum carbide ($Mo_2C$), tungsten carbide ($W_2C$,WC), carbon nitride ($C_3N_4$), and boron carbon nitride (BCN).

In the conductor 35, the terminals 36 and 37 of the helical coil are wound in a ring shape. Each of the outer diameters of the terminals 36 and 37 are set so as to be smaller than the outer diameter of the coil and the diameter of the magnetic substance 34, and the terminals 36 and 37 are disposed on the respective end surfaces, in the axial line O direction, of the magnetic substance 34.

The conductor 35 preferably contains at least one of silicon (Si), boron (B), and phosphorus (P). Since the softening point of the conductor 35 can be decreased, the compactness of the conductor 35 can be improved. As a result, the impact resistance of the conductor 35 can be improved, so that breakage of the conductor 35 due to vibration can be less likely to occur.

At least a part of the surface of the conductor 35 is covered with a magnetic layer 38 containing a Fe-containing oxide. The energy of noise can be consumed due to magnetic loss of the magnetic layer 38 covering the conductor 35, and thus a noise attenuation effect can be improved. A Fe-containing oxide that is the same as that of the magnetic substance 34 is used as the material of the magnetic layer 38, and thus the description thereof is omitted. The Fe-containing oxide contained in the magnetic layer 38 is suitably a ferrite. As the ferrite contained in the magnetic layer 38, a ferrite that is the same as or different from that of the magnetic substance 34 can be selected as appropriate. The magnetic layer 38 is formed on the surface of the conductor 35 by application of raw material paste having the Fe-containing oxide dispersed therein, plating, or the like.

The intermediate member 39 is a member which is interposed between the conductor 35 and the inner peripheral surface 13 of the insulator 11 to reduce impact to the conductor 35 and serves to fix the conductor 35 to the outer periphery of the magnetic substance 34. For the intermediate member 39, any material that can ensure desired strength at high temperature and has lower electrical conductivity than the conductor 35 can be used. Such a material is used for preventing a short-circuit of current flowing through the conductor 35.

For the intermediate member 39, a ceramic material such as $SiO_2$ and $Al_2O_3$ is used. In addition, crystallized glass or glass such as $Li_2O$—$Al_2O_3$—$SiO_2$-based glass may be used for the intermediate member 39. The intermediate member 39 is obtained by: performing molding by a known method such as insert molding with, as a center, the magnetic substance 34 integrated with the conductor 35, and applying raw material paste for the intermediate member 39 to the magnetic substance 34 integrated with the conductor 35; and sintering these components.

The intermediate member 39 preferably contains at least one of Si, B, and P. Accordingly, the softening point of the intermediate member 39 can be decreased and the intermediate member 39 can be vitrified, so that the intermediate member 39 can be compacted. As a result, the intermediate member 39 can firmly fix the conductor 35, and can ensure impact resistance of the conductor 35 to make breakage of the conductor 35 due to vibration less likely to occur.

The intermediate member 39 preferably contains a Fe-containing oxide. This is because a noise attenuation effect due to the Fe-containing oxide contained in the intermediate member 39 can be achieved in addition to the noise attenuation effect due to the magnetic substance 34 and the magnetic layer 38. A Fe-containing oxide that is the same as that of the magnetic substance 34 is used as the Fe-containing oxide of the intermediate member 39, and thus the description thereof is omitted. A ferrite is suitably used as the Fe-containing oxide contained in the intermediate member 39. As the ferrite of the intermediate member 39, a ferrite that is the same as or different from that of the magnetic substance 34 can be selected as appropriate.

The spark plug 10 is produced, for example, by a method described below. First, a molded product for the magnetic substance 34 is obtained by extrusion, and then a molded product, for the conductor 35, obtained by extrusion is helically wound on the molded product for the magnetic substance 34. These molded products are sintered to obtain a member in which the conductor 35 is helically disposed on the outer periphery of the magnetic substance 34. Next, the raw material paste for the magnetic layer 38 is applied to the surface of the conductor 35 of this member and dried, and then the raw material paste for the intermediate member 39 is applied to the surfaces of the magnetic substance 34 and the magnetic layer 38 and dried. The resultant member is sintered to obtain the composite portion 33.

Next, the center electrode 15 is inserted into the axial hole of the insulator 11 and is brought into engagement with the rearward facing surface 14. Next, raw material powder for the first seal portion 31 is put into the axial hole so as to surround the center electrode 15. The raw material powder, for the first seal portion 31, put into the axial hole is preliminarily compressed using a compression rod (not shown).

Next, the composite portion 33 is inserted into the axial hole and placed on the molded product of the raw material powder for the first seal portion 31. Next, raw material powder for the second seal portion 32 is put onto the composite portion 33. The raw material powder, for the second seal portion 32, put into the axial hole is preliminarily compressed using a compression rod (not shown).

Next, the insulator 11 in which the raw material powder for the first seal portion 31, the composite portion 33, and the raw material powder for the second seal portion 32 have been placed in this order is transferred into a furnace and heated, for example, to a temperature higher than the softening point of a glass component contained in each of the raw material powder for the first seal portion 31 and the second seal portion 32. After the heating, the metal terminal 16 is inserted into the axial hole of the insulator 11, and the raw material powder for the second seal portion 32 is compressed in the axial direction by the front end of the metal terminal 16. As a result, the first seal portion 31, the composite portion 33, and the second seal portion 32 are formed within the insulator 11.

Next, the insulator 11 is transferred out of the furnace, the metal shell 17 to which the ground electrode 21 is joined in advance is assembled to the outer periphery of the insulator 11. Next, the ground electrode 21 is bent such that the front end of the ground electrode 21 opposes the center electrode 15, whereby the spark plug 10 is obtained.

In the spark plug 10, since the conductor 35, which is helically disposed on the outer periphery of the magnetic substance 34, is electrically connected to the metal terminal 16 and the center electrode 15, the magnetic substance 34 and the conductor 35 block or absorb current in the frequency band that causes electric wave noise, of discharge current. Since the conductor 35, which is a wire, is made of one or more of the oxide conductor, carbon, and the carbon compound, the conductor 35 can be less likely to be oxidized, and a decrease in the cross-sectional area of the conductor 35 over time can be prevented. In addition, since the intermediate member 39 having lower electrical conductivity than the conductor 35 is in contact with the magnetic substance 34, the conductor 35, and the inner peripheral surface 13 of the insulator 11 and is disposed between the magnetic substance 34 and the conductor 35, and the inner peripheral surface 13 of the insulator 11, the conductor 35 can be less likely to vibrate, and breakage of the conductor 35 due to vibration can be less likely to occur. Thus, a reduction in the service life of the spark plug 10 due to a decrease in the cross-sectional area of the conductor 35 or breakage of the conductor 35 can be inhibited.

Since the terminals 36 and 37 of the conductor 35 are formed in a ring shape and exposed from the magnetic substance 34 and the intermediate member 39, contact areas between the first seal portion 31 and the second seal portion 32 and the terminals 36 and 37 can be ensured. In addition, since the terminals 36 and 37 of the conductor 35 are in contact with the end surfaces, in the axial line O direction, of the magnetic substance 34, when the metal terminal 16 inserted into the axial hole compresses the raw material powder for the second seal portion 32 in the axial direction in the process for producing the spark plug 10, the terminals 36 and 37 of the conductor 35 can be less likely to be broken.

Figure 3:
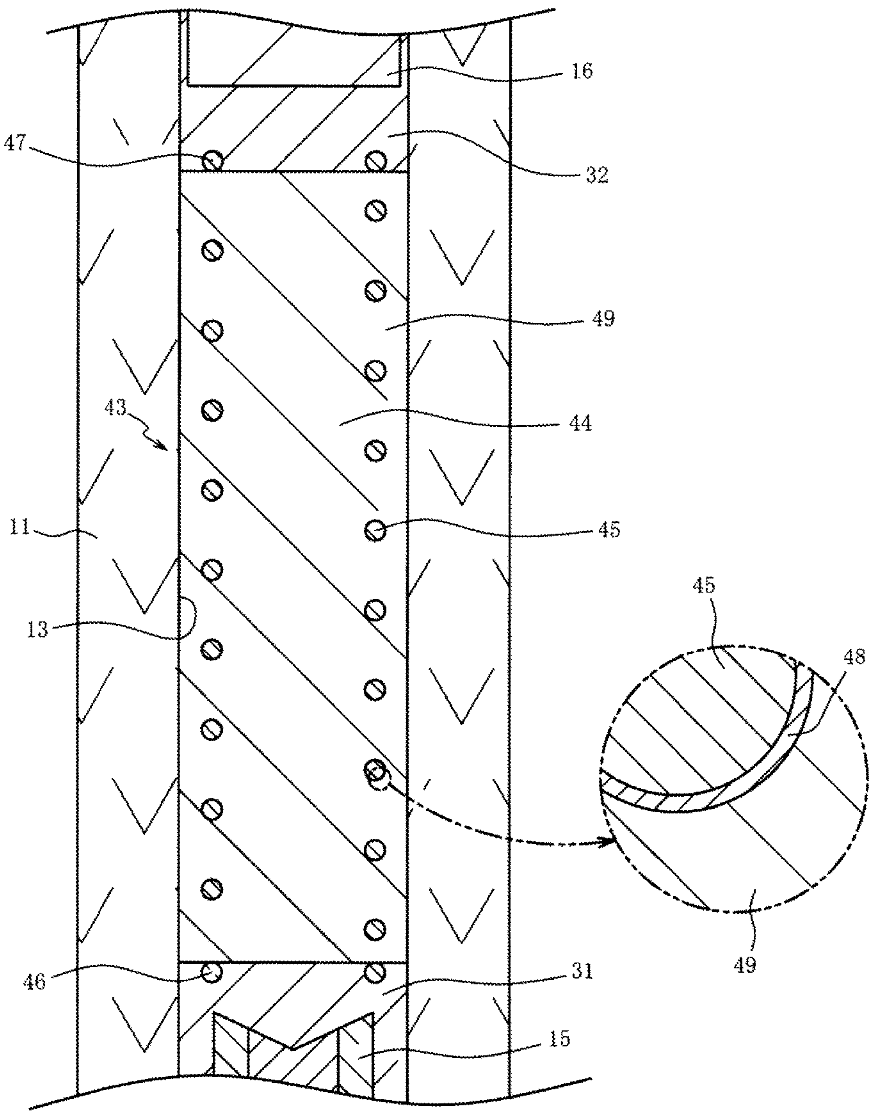
FIG. 3 is a cross-sectional view of a composite portion of a spark plug according to a second embodiment.

Next, a second embodiment will be described with reference to FIG. 3. In the first embodiment, the case where the magnetic substance 34 and the intermediate member 39 are separately molded has been described. On the other hand, in the second embodiment, the case where a magnetic substance 44 and an intermediate member 49 are integrally molded will be described. The same components as those described in the first embodiment are designated by the same reference numerals, and the description thereof is omitted, FIG. 3 is a cross-sectional view of a composite portion 43 of a spark plug according to the second embodiment. The composite portion 43 is disposed within the insulator 11, instead of the composite portion 33 described in the first embodiment.

The composite portion 43 includes: the magnetic substance 44 formed from a Fe-containing oxide; a conductor 45 which is helically disposed on the outer periphery of the magnetic substance 44; and the intermediate member 49 which is in contact with the magnetic substance 44, the conductor 45, and the inner peripheral surface 13 of the insulator 11 and is disposed between the magnetic substance 44 and the conductor 45, and the inner peripheral surface 13. A terminal 46 connected at the lower end of the conductor 45 in the axial line O direction (the up-down direction in FIG. 3) is in contact with the first seal portion 31, and a terminal 47 connected at the upper end of the conductor 45 is in contact with the second seal portion 32. The materials of the magnetic substance 44 and the conductor 45 are the same as those of the magnetic substance 34 and the conductor 35 described in the first embodiment, and thus the description thereof is omitted.

At least a part of the surface of the conductor 45 is covered with a coating layer 48 made of a metal. Examples of the material of the coating layer 48 include noble metals such as Au, Ag, Pt, and Pd, simple metals such as Cu, Ni, and Co, and alloys of these metals. The coating layer 48 is formed on the conductor 45 by means of vapor deposition, plating, coating and baking of metal raw material paste, or the like. In the present embodiment, the coating layer 48 is formed from Ni or a Ni-based alloy.

The intermediate member 49 is formed from a Fe-containing oxide and integrally molded with the magnetic substance 44. As the Fe-containing oxide of the intermediate member 49, a Fe-containing oxide that is the same as that of the magnetic substance 34 described in the first embodiment is used, and thus the description thereof is omitted. By the magnetic substance 44 and the intermediate member 49 being integrally molded, the conductor 45 is embedded in the magnetic substance 44 and the intermediate member 49.

The intermediate member 49 preferably contains at least one of Si, B, and P. This is because the intermediate member 49 can be compacted. As a result, the intermediate member 49 can firmly fix the conductor 45, and can ensure impact resistance of the conductor 45 to make breakage of the conductor 45 due to vibration less likely to occur.

The composite portion 43 is produced, for example, by a method described below. First, a helical molded product for the conductor 45 is obtained by extrusion and then sintered to obtain the helical conductor 45. Next, the coating layer 48 is formed on the surface of the conductor 45 by plating. The conductor 45 having the coating layer 48 formed thereon is set to a mold, and then a molded product in which the conductor 45 is embedded in the magnetic substance 44 and the intermediate member 49 is obtained by insert molding. This molded product is sintered to obtain the composite portion 43 in which the conductor 45 is included in the magnetic substance 44 and the intermediate member 49. The composite portion 43 is placed inside the insulator 11, instead of the composite portion 33 described in the first embodiment, whereby the spark plug is obtained.

Since the coating layer 48 is formed on the surface of the conductor 45, when a glass component is contained in the magnetic substance 44 or the intermediate member 49, the coating layer 48 can be interposed between the conductor 45 and the glass component and inhibit reaction between the conductor 45 and the glass component. Thus, the coating layer 48 inhibits wear of the conductor 45 caused by reaction with the glass component, so that a reduction in the service life due to wear of the conductor 45 can be inhibited.

In particular, since the coating layer 48 is formed from Ni or a Ni-based alloy, the corrosion resistance of the coating layer 48 can be enhanced with the heat resistance thereof maintained. As a result, a reduction in the service life due to wear of the conductor 45 can be further inhibited. In addition, the magnetic permeability of the coating layer 48 can be increased by Ni, and thus the noise attenuation effect can be further improved.

EXAMPLES

The present invention will be described in more detail by means of examples. However, the present invention is not limited to the examples.

Samples of spark plugs were produced, and the levels of discharge current before and after a discharge test and presence/absence of an abnormality after an impact resistance test were checked. Table 1 shows the materials and the dimensions of conductors, presence/absence and the materials of coating layers covering the conductors, presence/absence and the materials of magnetic layers covering the conductors, the materials of magnetic substances and intermediate members, and the specific resistances of the intermediate members of the produced samples 1 to 26, and Table 2 shows the test results of the produced samples 1 to 26.

TABLE 1

| | Conductor | | | | | | | |
|---|---|---|---|---|---|---|---|---|
| | | | Dimensions (mm) | | | | | |
| No | Main material | Additive | Outer diameter | Gap | Wire diameter | Length | Coating layer | Magnetic layer |
| 1 | C | — | 1.5 | 0.3 | 0.2 | 7.0 | — | — |
| 2 | TiC | — | 1.0 | 1.0 | 0.6 | 15.0 | — | — |
| 3 | $SrCrO_3$ | — | 3.5 | 0.8 | 0.8 | 30.0 | — | — |
| 4 | $LaCoO_3$ | — | 2.3 | 0.5 | 1.0 | 20.0 | — | — |
| 5 | $(La_{0.5}Sr_{0.5})CrO_3$ | Si | 2.6 | 0.8 | 0.6 | 15.0 | — | — |
| 6 | $LaCoO_3$ | B | 2.7 | 0.7 | 0.6 | 20.0 | — | — |
| 7 | $SrCrO_3$ | P | 2.7 | 0.3 | 0.4 | 30.0 | — | — |
| 8 | $CaCrO_3$ | Si, P | 2.5 | 1.0 | 0.2 | 30.0 | — | — |
| 9 | $LaMnO_3$ | Si | 2.5 | 0.8 | 0.2 | 20.0 | — | — |
| 10 | SrCrO3 | Si | 1.5 | 0.7 | 0.6 | 25.0 | — | — |
| 11 | $LaMnO_3$ | Si, B | 2.5 | 1.0 | 0.2 | 25.0 | — | — |
| 12 | $SrMoO_3$ | Si, P | 1.5 | 0.3 | 0.8 | 25.0 | — | — |
| 13 | $LiTi_2O_4$ | P, B | 2.5 | 0.3 | 1.0 | 30.0 | — | — |
| 14 | $SrVO_3$ | Si | 1.5 | 1.0 | 1.0 | 30.0 | — | — |
| 15 | C | — | 2.5 | 0.3 | 0.2 | 20.0 | — | — |
| 16 | C | Si | 2.5 | 0.3 | 0.2 | 20.0 | Cu | — |
| 17 | WC | Si, P | 2.5 | 0.3 | 0.3 | 17.0 | Pt | — |
| 18 | $SrCrO_3$ | Si | 2.5 | 0 5 | 0.5 | 20.0 | Ag | — |
| 19 | $(La_{0.5}Sr_{0.5})CrO_3$ | P | 2.6 | 0.5 | 0.5 | 15.0 | Ni | — |
| 20 | $CaCrO_3$ | B | 2.4 | 0.3 | 0.4 | 20.0 | Ni | — |
| 21 | $IrO_2$ | Si | 1.0 | 0.6 | 0.8 | 30.0 | Ni | $NiFe_2O_4$ |
| 22 | $(La_{0.5}Sr_{0.5})CrO_3$ | B | 2.7 | 0.8 | 0.8 | 15.0 | Ni | $MnFe_2O_4$ |
| 23 | $(In_{0.97}Y_{0.03})O_3$ | P | 2.6 | 0.8 | 0.6 | 15.0 | Ni | $(Ni_{0.5}Zn_{0.5})Fe_2O_4$ |
| 24 | C | — | 2.6 | 0.3 | 0.3 | 17.0 | — | — |
| 25 | $(La_{0.5}Sr_{0.5})CrO_3$ | — | 2.5 | 0.8 | 0.4 | 15.0 | — | — |
| 26 | C | — | 2.5 | 0.5 | 0.5 | 20.0 | — | — |

| | | Intermediate member | | | |
|---|---|---|---|---|---|
| No | Magnetic substance | Main material A | Main material B | Additive | Specific resistance (Ω · m) |
| 1 | $NiFe_2O_4$ | $Al_2O_3$ | — | — | $5 \times 10^{14}$ |
| 2 | $MgFe_2O_4$ | $ZrO_2$ | — | — | $1 \times 10^{14}$ |
| 3 | $CaFe_2O_4$ | $TiO_2$ | — | — | $1 \times 10^{10}$ |
| 4 | $CoFe_2O_4$ | $Al_2O_3$, $ZrO_2$ | — | — | $5 \times 10^{14}$ |
| 5 | $(Ni_{0.5}Zn_{0.5})Fe_2O_4$ | $Al_2O_3$ | — | — | $5 \times 10^{14}$ |
| 6 | $CuFe_2O_4$ | $Al_2O_3$, $ZrO_2$ | — | — | $1 \times 10^{14}$ |
| 7 | $Y_3Fe_5O_{12}$ | $TiO_2$ | — | — | $1 \times 10^{10}$ |
| 8 | $(Mg_{0.5}Zn_{0.5})Fe_2O_4$ | $ZrO_2$ | — | — | $1 \times 10^{12}$ |
| 9 | $NiFe_2O_4$ | $Al_2O_3$ | — | Si | $5 \times 10^{14}$ |
| 10 | $(Mn_{0.5}Zn_{0.5})Fe_2O_4$ | $Al_2O_3$, $TiO_2$ | — | P | $1 \times 10^{12}$ |
| 11 | $CaFe_2O_4$ | $ZrO_2$ | — | B | $1 \times 10^{14}$ |
| 12 | $NiFe_2O_4$ | — | $NiFe_2O_4$ | Si, P | $5 \times 10^{7}$ |
| 13 | $MnFe_2O_4$ | $Al_2O_3$ | $MnFe_2O_4$ | Si, B | $1 \times 10^{7}$ |
| 14 | $(Ni_{0.5}Zn_{0.5})Fe_2O_4$ | — | $(Ni_{0.5}Zn_{0.5})Fe_2O_4$ | P, B | $5 \times 10^{7}$ |
| 15 | $(Ni_{0.5}Zn_{0.5})Fe_2O_4$ | — | $(Ni_{0.5}Zn_{0.5})Fe_2O_4$ | — | $5 \times 10^{7}$ |
| 16 | $CoFe_2O_4$ | — | $CoFe_2O_4$ | Si | $5 \times 10^{6}$ |
| 17 | $(Ni_{0.3}Zn_{0.7})Fe_2O_4$ | — | $(Ni_{0.3}Zn_{0.7})Fe_2O_4$ | Si | $5 \times 10^{7}$ |
| 18 | $NiFe_2O_4$ | $Al_2O_3$ | $(Mn_{0.5}Zn_{0.5})Fe_2O_4$ | P, B | $5 \times 10^{7}$ |
| 19 | $MgFe_2O_4$ | — | $(Ni_{0.5}Zn_{0.5})Fe_2O_4$ | Si | $5 \times 10^{7}$ |
| 20 | $(Mg_{0.5}Zn_{0.5})Fe_2O_4$ | — | $(Mg_{0.5}Zn_{0.5})Fe_2O_4$ | P | $5 \times 10^{7}$ |
| 21 | $NiFe_2O_4$ | $ZrO_2$ | $NiFe_2O_4$ | Si | $5 \times 10^{10}$ |
| 22 | $MnFe_2O_4$ | — | $MnFe_2O_4$ | B | $5 \times 10^{2}$ |
| 23 | $(Ni_{0.5}Zn_{0.5})Fe_2O_4$ | — | $(Ni_{0.5}Zn_{0.5})Fe_2O_4$ | Si, B | $5 \times 10^{7}$ |
| 24 | $Al_2O_3$ | $Al_2O_3$ | — | — | $5 \times 10^{14}$ |
| 25 | $ZrO_2$ | $ZrO_2$ | — | — | $1 \times 10^{14}$ |
| 26 | $NiFe_2O_4$ | $SrCrO_3$ | — | — | $5 \times 10^{-5}$ |

TABLE 2

| | Level of discharge current (dB) | | | | | | | Impact resistance |
|---|---|---|---|---|---|---|---|---|
| | Before test | | | After test | | | Difference | Abnormality |
| No | 10 MHz | 100 MHz | 500 MHz | 10 MHz | 100 MHz | 500 MHz | (average) | ratio (%) |
| 1 | 87 | 86 | 86 | 91 | 90 | 90 | 4.0 | 25 |
| 2 | 88 | 87 | 86 | 92 | 91 | 90 | 4.0 | 20 |

TABLE 2-continued

| No | Level of discharge current (dB) Before test 10 MHz | 100 MHz | 500 MHz | After test 10 MHz | 100 MHz | 500 MHz | Difference (average) | Impact resistance Abnormality ratio (%) |
|---|---|---|---|---|---|---|---|---|
| 3 | 88 | 88 | 87 | 93 | 94 | 91 | 5.0 | 25 |
| 4 | 86 | 86 | 88 | 94 | 91 | 92 | 5.7 | 20 |
| 5 | 88 | 86 | 88 | 93 | 93 | 91 | 5.0 | 10 |
| 6 | 86 | 86 | 89 | 93 | 91 | 92 | 5.0 | 15 |
| 7 | 88 | 88 | 86 | 94 | 95 | 91 | 6.0 | 10 |
| 8 | 89 | 87 | 86 | 94 | 94 | 91 | 5.7 | 5 |
| 9 | 88 | 86 | 87 | 91 | 93 | 93 | 5.3 | 0 |
| 10 | 87 | 86 | 88 | 92 | 93 | 94 | 6.0 | 0 |
| 11 | 89 | 89 | 87 | 92 | 93 | 94 | 4.7 | 0 |
| 12 | 81 | 82 | 81 | 88 | 88 | 87 | 6.3 | 0 |
| 13 | 83 | 84 | 84 | 89 | 88 | 88 | 4.7 | 0 |
| 14 | 83 | 81 | 84 | 89 | 90 | 87 | 6.0 | 0 |
| 15 | 80 | 81 | 81 | 84 | 84 | 86 | 4.0 | 0 |
| 16 | 81 | 83 | 83 | 83 | 84 | 83 | 1.0 | 0 |
| 17 | 84 | 83 | 81 | 85 | 83 | 82 | 0.7 | 0 |
| 18 | 83 | 81 | 80 | 83 | 82 | 81 | 0.7 | 0 |
| 19 | 77 | 76 | 75 | 78 | 78 | 75 | 1.0 | 0 |
| 20 | 76 | 78 | 76 | 76 | 79 | 78 | 1.0 | 0 |
| 21 | 71 | 72 | 71 | 72 | 72 | 72 | 0.7 | 0 |
| 22 | 70 | 73 | 72 | 70 | 74 | 72 | 0.3 | 0 |
| 23 | 73 | 70 | 70 | 74 | 71 | 70 | 0.7 | 0 |
| 24 | 93 | 91 | 93 | 99 | 96 | 96 | 4.7 | 25 |
| 25 | 95 | 93 | 93 | 99 | 98 | 99 | 5.0 | 25 |
| 26 | 94 | 93 | 95 | 99 | 98 | 99 | 4.7 | 20 |

The materials (a main material and an additive) of each conductor shown in Table 1 were specified from raw material powder for the conductor. The materials of the conductor may be specified by analyzing a cross-section of the conductor by ICP, micro X-ray diffraction, WDS analysis using EPMA, etc. The main material is a material having the highest content among compounds or elements forming the conductor. As the additive, elements corresponding to Si, B, and P are shown. The content of the additive in the conductor (the result of analysis by ICP) was in the range of 0.1 to 9 wt %. The content is a content obtained by converting the amount of Si, B, and P in terms of oxide. The conductor can contain minute amounts (for example, about 1 ppm) of various impurities mixed in the production process.

As the dimensions of the conductor, the outer diameter of the helix of the conductor, the gap between material cross-sections parallel to the center lines of the conductors adjacent to each other in a cross-section including the center line of the helix of the conductor (a so-called inter-wire gap), the wire diameter, and the length from the terminal to the other terminal of the conductor are shown in Table 1.

The material of the coating layer covering the conductor was specified by WDS analysis using EPMA. The coating layer can contain minute amounts (for example, about 1 ppm) of various impurities mixed in the production process. The material of the magnetic layer covering the coating layer formed on the surface of the conductor was specified by micro X-ray diffraction.

The material of the magnetic substance was specified from raw material powder for the magnetic substance. The material may be specified by analyzing a cross-section of the magnetic substance by micro X-ray diffraction. The magnetic substance can contain minute amounts (for example, about 1 ppm) of various impurities mixed in the production process.

The materials (a main material A, a main material B, and an additive) of the intermediate member were specified from raw material powder for the intermediate member. The materials may be specified by analyzing a cross-section of the intermediate member by ICP, micro X-ray diffraction, WDS analysis using EPMA, etc. When the main material A and the main material B were contained in the intermediate member, the total amount of the main material A and the main material B was in the range of 20 to 80 wt %. As the additive, elements corresponding to Si, B, and P are shown. The content of the additive in the intermediate member (the result of analysis by ICP) was in the range of 0.1 to 9 wt %. The content is a content obtained by converting the amount of Si, B, and P in terms of oxide. The intermediate member can contain minute amounts (for example, about 1 ppm) of various impurities mixed in the production process.

The specific resistance of the intermediate member was measured by a direct-current four-terminal method using a resistance measurement sample that was additionally prepared such that the dimensions thereof were larger than those of the intermediate member of the sample to be subjected to the test. The composition of the resistance measurement sample is the same as the composition of the intermediate member of the sample to be subjected to the test.

The level of discharge current was measured according to "Automobiles—Radio Noise Characteristics—Second Part, Measuring Method of Prevention Device, Current Method" of JASO D002-2: 2004. Specifically, the distance of the spark gap between the center electrode and the ground electrode of each sample was adjusted to 0.9 mm±0.01 mm, and a voltage in the range of 13 kV to 16 kV was applied between the metal terminal and the metal shell to cause discharge. The current flowing through the metal terminal during discharge was measured using a current probe, and the levels of discharge current (conversion values with respect to a predetermined reference (unit: dB)) at 10 MHz, 100 MHz, and 500 MHz before the test were calculated.

The discharge test was a test in which, in a state where the distance of the spark gap between the center electrode and the ground electrode of each sample is adjusted to 0.9 mm±0.01 mm and each sample is kept in a chamber at 400° C., a voltage of 25 kV is applied between the metal terminal and the metal shell to cause discharge. A test in which discharge is caused 60 times per second was conducted for 100 hours. Similar to before the test, the levels of discharge current (conversion values with respect to a predetermined reference (unit: dB)) at 10 MHz, 100 MHz, and 500 MHz were calculated according to JASO D002-2: 2004. Table 2 shows the levels before the test, the levels after the test, and the average of differences at the respective frequencies each obtained by subtracting the level before the test from the level after the test.

The impact resistance was evaluated according to Section 7.4 Impact resistance Test in JIS B8031: 2006. Each sample was set, to a tester, impact was applied to the sample 400 times per minute (vibration amplitude: 22 mm) for 10 minutes, and then conduction between the metal terminal and the center electrode was checked. The number of samples is 20, and an abnormality ratio (%) shown in Table 2 is a proportion of the samples for which conduction was not confirmed (breakage occurred) to the 20 samples.

As shown in Table 2, in the samples 1 to 23 (examples) including the magnetic substance formed from the ferrite, the levels of current at 10 MHz, 100 MHz, and 500 MHz during discharge were decreased as compared to those in the samples 24 and 25 containing no ferrite and the sample 26 in which the specific resistance of the intermediate member was lower than the specific resistance of the conductor (the electrical conductivity was high) (the samples 24 to 26 are comparative examples). The samples 1 to 23 can decrease the levels of current in a high frequency band which causes electric wave noise, and thus can obviously reduce electric wave noise.

In the samples 5 to 8 in which the additive was contained in the conductor, the abnormality ratio was decreased as compared to that in the samples 1 to 4 in which no additive was contained in the conductor. Regarding the samples 5 to 8, it is inferred that the conductor was less likely to be broken since the conductor was compacted due to the additive contained in the conductor as compared to that in the samples 1 to 4.

In the samples 9 to 11 in which the additive was contained in the intermediate member, the abnormality ratio was decreased as compared to that in the samples 5 to 8 in which no additive was contained in the intermediate member. Regarding the samples 9 to 11, it is inferred that the conductor was less likely to be broken since the intermediate member was compacted due to the additive contained in the intermediate member as compared to that in the samples 5 to 8.

In the samples 12 to 15 in which the ferrite was contained in the intermediate member, the levels of discharge current before and after the test were decreased as compared to those in the samples 9 to 11 in which no ferrite was contained in the intermediate member. Regarding the samples 12 to 15, it is inferred that the noise attenuation performance was improved since the ferrite was contained in the intermediate member as well as in the magnetic substance.

In the samples 16 to 20 in which the coating layer covering the conductor was formed, the difference (average) between the levels of discharge current before and after the test was decreased as compared to that in the samples 12 to 15 in which no coating layer was present. Regarding the samples 16 to 20, it is inferred that, since the coating layer was interposed between the conductor and the intermediate member, reaction between the conductor and the glass component of the intermediate member was inhibited, and the noise attenuation performance was maintained even after the discharge test in the environment of 400° C.

In particular, in the samples 19 and 20 in which the coating layer made of Ni was formed, the levels of discharge current before and after the test were decreased as compared to those in the samples 16 to 18 in which the coating layer made of Cu, Pt, or Ag was formed. Regarding the samples 19 and 20, it is inferred that the noise attenuation effect was improved by the magnetism of Ni contained in the coating layer.

In the samples 21 to 23 in which the conductor was covered with the magnetic layer, the levels of discharge current before and after the test were decreased as compared to those in the samples 19 and 20 in which no magnetic layer was formed. Regarding the samples 21 to 23, it is inferred that the noise attenuation effect was further improved by the ferrite contained in the magnetic layer.

Although the present invention has been described based on the embodiments, the present invention is not limited to the above embodiments at all. It can be easily understood that various modifications may be made without departing from the gist of the present invention.

In the first embodiment, the case where the magnetic layer 38 is formed on the conductor 35 has been described, but the present invention is not necessarily limited thereto. As a matter of course, as described in the second embodiment and the samples 16 to 23 which are examples, a coating layer can be formed on the conductor 35. In the case where a coating layer is formed on the conductor 35, the magnetic layer 38 is formed on the surface of the coating layer. The reason is to inhibit reaction between the magnetic layer 38 and the conductor 35 by the coating layer.

In the first embodiment, the case where the magnetic layer 38 is formed on the conductor 35 has been described. However, as a matter of course, the magnetic layer 38 can be omitted. In addition, in the second embodiment, the case where the coating layer 48 is formed on the conductor 45 has been described, but the present invention is not necessarily limited thereto. As a matter of course, the coating layer 48 can be omitted. Even when the magnetic layer 38 or the coating layer 48 is not present, the noise attenuation characteristics can be improved by the magnetic substance 34 or 44 present inside the helical conductor 35 or 45.

In each embodiment, the conductor 35 or 45 and the intermediate member 39 or 49 preferably contain at least one of Si, B, and P. However, the present invention is not necessarily limited thereto. This is because, in the case of compacting the conductor 35 or 45 or the intermediate member 39 or 49, even when the raw material powder for the conductor 35 or 45 or the intermediate member 39 or 49 does not contain at least one of Si, B, and P, the sinterability can be improved by adjusting the particle size of the raw material powder or the packing density of a molded product before sintering.

In each embodiment, the case where the terminals 36 and 37 of the conductor 35 or the terminals 46 and 47 of the conductor 45 are disposed on the end surfaces of the magnetic substance 34 or 44 or the intermediate member 49 has been described, but the present invention is not necessarily limited thereto. As a matter of course, the ring-shaped portions that are the terminals 36 and 37 of the conductor 35 or the terminals 46 and 47 of the conductor 45 can be eliminated, and a part of the conductor 35 or 45 can be exposed from each end surface of the magnetic substance 34 or 44 or the intermediate member 39 or 49. This is because, even when the terminals 36 and 37 or 46 and 47 are omitted, a part of the conductor 35 or 45 exposed from the magnetic substance 34 or 44 or the intermediate member 39 or 49 can be connected to the first seal portion 31 or the second seal portion 32.

In each embodiment, the case where the second seal portion 32 is provided to the connection portion 30 has been described, but the present invention is not necessarily limited thereto. As a matter of course, instead of the second seal portion 32, an elastic member (connection portion) such as a spring having electrical conductivity can be interposed between the conductor 35 or 45 and the metal terminal 16 to electrically connect the conductor 35 or 45 and the metal terminal 16 to each other.

In each embodiment, the case where the preformed composite portion 33 or 43 is inserted into the axial hole of the insulator 11 has been described as the method for producing the spark plug 10, but the present invention is not necessarily limited thereto. For example, in the first embodiment, after a member obtained by integrating the conductor 35 and the magnetic substance 34 is formed, inserted into the axial hole of the insulator 11, and placed on the raw material powder for the first seal portion 31, the raw material powder for the intermediate member 39 can be put into the axial hole so as to surround the member. In this case, as a result of heating the insulator 11 in the furnace, the intermediate member 39 can be disposed between the conductor 35 and the magnetic substance 34, and the inner peripheral surface 13 of the insulator 11.

In each embodiment, the spark plug 10 in which the ground electrode 21 opposes the front end of the center electrode 15 has been described, but the structure of the spark plug is not necessarily limited thereto. As for other structures for the spark plug, a spark plug in which the ground electrode 21 opposes the side surface of the center electrode 15 and a multipole spark plug in which a plurality of ground electrodes 21 are joined to the metal shell 17, are exemplified.

DESCRIPTION OF REFERENCE NUMERALS

10: spark plug
11: insulator
13: inner peripheral surface
15: center electrode
16: metal terminal
30: connection portion
34, 44: magnetic substance
35, 45: conductor
38: magnetic layer
39, 49: intermediate member
48: coating layer Having described the invention, the following is claimed:

1. A spark plug comprising:

an insulator having an axial hole extending in an axial line direction from a front side to a rear side;

a center electrode disposed at the front side of the axial hole;

a metal terminal disposed at the rear side of the axial hole; and a connection portion disposed in the axial hole and between the metal terminal and the center electrode, wherein the connection portion includes a magnetic substance formed from a Fe-containing oxide, a conductor which is a wire helically disposed on an outer periphery of the magnetic substance and electrically connected to the metal terminal and the center electrode, and an intermediate member which is in contact with the magnetic substance, the conductor, and an inner peripheral surface of the insulator, is disposed between the magnetic substance and the conductor, and the inner peripheral surface, and has lower electrical conductivity than the conductor, and the conductor is made of one or more of an oxide conductor, carbon, and a carbon compound.

2. The spark plug according to claim 1, wherein at least one of the conductor and the intermediate member further contains at least one of Si, B, and P.

3. The spark plug according to claim 1, wherein the intermediate member contains a Fe-containing oxide.

4. The spark plug according to claim 2, wherein the intermediate member contains a Fe-containing oxide.

5. The spark plug according to claim 1, wherein at least a part of a surface of the conductor is covered with a coating layer made of a metal.

6. The spark plug according to claim 2, wherein at least a part of a surface of the conductor is covered with a coating layer made of a metal.

7. The spark plug according to claim 3, wherein at least a part of a surface of the conductor is covered with a coating layer made of a metal.

8. The spark plug according to claim 4, wherein at east a part of a surface of the conductor is covered with a coating layer made of a metal.

9. The spark plug according to claim 5, wherein the coating layer is formed from Ni or a Ni-based alloy.

10. The spark plug according to claim 6, wherein the coating layer is formed from Ni or a Ni-based alloy.

11. The spark plug according to claim 7, wherein the coating layer is formed from Ni or a Ni-based alloy.

12. The spark plug according to claim 8, wherein the coating layer is formed from Ni or a Ni-based alloy.

13. The spark plug according to claim 1, wherein at least a part of a surface of the conductor is covered with a magnetic layer containing a Fe-containing oxide.

14. The spark plug according to claim 2, wherein at least a part of a surface of the conductor is covered with a magnetic layer containing a Fe-containing oxide.

15. The spark plug according to claim 3, wherein at least a part of a surface of the conductor is covered with a magnetic layer containing a Fe-containing oxide.

16. The spark plug according to claim 5, wherein at least a part of a surface of the conductor is covered with a magnetic layer containing a Fe-containing oxide.

17. The spark plug according to claim 9, wherein at least a part of a surface of the conductor is covered with a magnetic layer containing a Fe-containing oxide.

* * * * *